(12) United States Patent
Nicolaescu et al.

(10) Patent No.: US 6,757,091 B1
(45) Date of Patent: Jun. 29, 2004

(54) METHOD AND APPARATUS FOR PHASE SHIFTING AN OPTICAL BEAM IN AN OPTICAL DEVICE

(75) Inventors: Remus Nicolaescu, San Francisco, CA (US); Richard Jones, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/397,667

(22) Filed: Mar. 25, 2003

(51) Int. Cl.[7] .............................. G02F 1/00; G02F 1/01; G02F 1/03; G02F 1/035; H01P 9/00
(52) U.S. Cl. ...................... 359/237; 359/238; 359/244; 359/248; 385/1; 385/3; 333/157
(58) Field of Search ................................ 359/237, 238, 359/244, 248, 245; 385/1, 3; 333/157

(56) References Cited

U.S. PATENT DOCUMENTS 3,649,931 A * 3/1972 Macek ...................... 372/94
4,271,397 A * 6/1981 Stiles et al. ................ 372/94

* cited by examiner

Primary Examiner—Georgia Epps
Assistant Examiner—Tim Thompson
(74) Attorney, Agent, or Firm—Blakely, Sokoloff, Taylor & Zafman LLP

(57) ABSTRACT

An apparatus and method for modulating a phase of optical beam. In one embodiment, an apparatus according to embodiments of the present invention includes a first region of semiconductor material disposed in a second region of semiconductor material. An insulating region is disposed between the first and second regions of semiconductor material defining a plurality of interfaces between the insulating region and the first and second regions of semiconductor material. An angle of incidence between an optical beam and the plurality of interfaces is substantially equal to Brewster's angle. A plurality of charge modulated regions proximate to the plurality of interfaces in the first and second regions of semiconductor are included such that the optical beam directed through the plurality of interfaces and the plurality of charge modulated regions is phase shifted in response to the plurality of charge modulated regions.

28 Claims, 5 Drawing Sheets

METHOD AND APPARATUS FOR PHASE SHIFTING AN OPTICAL BEAM IN AN OPTICAL DEVICE

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Methods and apparatuses for phase shifting an optical beam with an optical device are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a plurality of charge modulated regions disposed along an optical path through semiconductor material. The charge modulated regions are disposed proximate to interfaces defined between the semiconductor material and insulating material. In one embodiment, the interfaces between the semiconductor material and insulating material are defined such that an angle of incidence between an optical beam directed along the optical path and the interfaces is substantially equal to Brewster's angle. As the optical beam is directed through the charged modulated regions, the optical beam is phase shifted in response to the charge modulated region. Embodiments of the disclosed optical phase shifter can be used in a variety of high bandwidth applications including multi-processor, telecommunications, networking or the like. For instance, embodiments of the optical phase shifters can be employed in high speed optical applications including optical delay lines, switches, modulators, add/drops, or the like.

Figure 1:
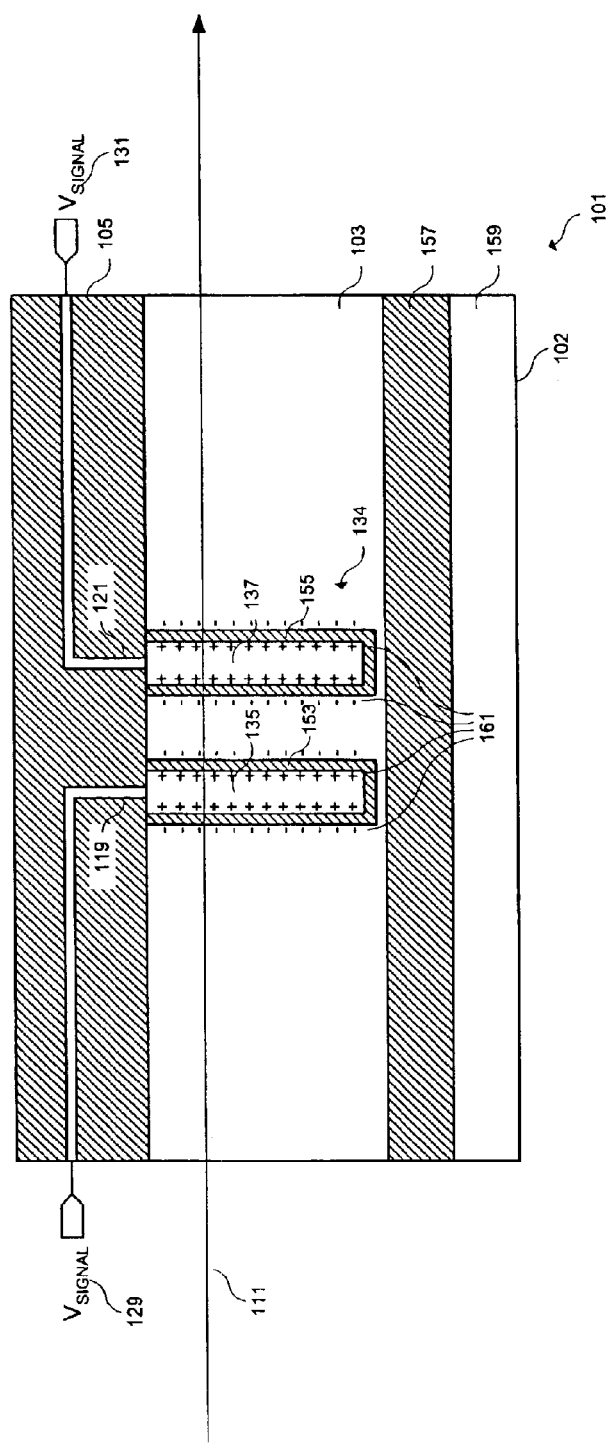
FIG. 1 is a side view illustration of one embodiment of an optical device including a phase modulating structure having normal incidence interfaces for an optical beam.

To illustrate, FIG. 1 is a side view diagram illustrating generally one embodiment of an optical phase shifter 101 including modulated charge regions 161 in accordance with the teachings of the present invention. As shown in the depicted embodiment, optical phase shifter 101 is included in a silicon-on-insulator (SOI) wafer 102 having a buried insulating layer 157 disposed between a layer of semiconductor material 103 and a layer of semiconductor material 159. In one embodiment, an optical path is directed through semiconductor material 103, through which an optical beam 111 propagates through a phase adjusting device 134. In one embodiment, the phase adjusting device 134 includes a plurality of charge modulated regions 161 provided with a plurality of capacitive structures disposed in semiconductor material 103. As shown in the embodiment of FIG. 1, the charge modulated regions are proximate to the interfaces defined between semiconductor material region 103 and semiconductor material regions 135 and 137 of phase adjusting device 134.

In FIG. 1, the plurality of capacitive structures of phase adjusting device 134 are shown having trench capacitors including semiconductor regions 135 and 137 disposed in semiconductor material 103. In the depicted embodiment, insulating regions 153 and 155 are disposed between semiconductor material regions 135 and 137 and semiconductor material 103. In one embodiment, the semiconductor regions 135 and 137 of the trench capacitors include polysilicon, insulating regions 153 and 155 include an oxide such as $SiO_2$ and semiconductor material 103 includes silicon. In one embodiment, optical beam 111 includes infrared or near infrared laser light. As known to those skilled in the art, silicon is partially transparent to infrared or near infrared light. For instance, in one embodiment optical beam 111 has an infrared wavelength of approximately 1.55 or 1.3 micrometers. It is appreciated of course that other wavelengths may be utilized for optical beam 111 in accordance with the teachings of the present invention.

In one embodiment, a modulation signal $V_{SIGNAL}$ 129 and a modulation signal $V_{SIGNAL}'$ 131 are coupled to be received by semiconductor regions 135 and 137, respectively, of the trench capacitors of phase adjusting device 134. In one embodiment, modulation signal $V_{SIGNAL}$ 129 and modulation signal $V_{SIGNAL}'$ 131 are electric signals generated by control circuitry on the same integrated circuit die of phase adjusting device 134. In one embodiment, the control circuit generating modulation signal $V_{SIGNAL}$ 129 and modulation signal $V_{SIGNAL}'$ 131 is disposed in semiconductor material 103 outside of the optical path of an optical beam 111. In another embodiment, modulation signal $V_{SIGNAL}$ 129 and modulation signal $V_{SIGNAL}'$ 131 are generated by control circuitry external to the integrated circuit die of phase adjusting device 134.

In one embodiment, modulation signal $V_{SIGNAL}$ 129 and modulation signal $V_{SIGNAL}'$ 131 are coupled to be received by semiconductor regions 135 and 137, respectively, of the trench capacitors of phase adjusting device 134 through conductors 119 and 121, respectively, which are disposed in an optical confinement layer 105 of optical phase shifter 101. In one embodiment, optical confinement layer 105 is an insulating layer and includes a dielectric layer of the SOI wafer in which optical phase shifter 101 is disposed. In one embodiment, buried insulating layer 157 also serves as an optical confinement layer to help confine optical beam 111 to remain within semiconductor material 103.

In one embodiment, modulation signal $V_{SIGNAL}$ 129 and modulation signal $V_{SIGNAL}'$ 131 are a plurality of different signals separately coupled to be received by semiconductor regions 135 and 137, respectively, of the trench capacitors of phase adjusting device 134. For example, in one embodiment, $V_{SIGNAL}$ 129 and modulation signal $V_{SIGNAL}'$ 131 are the same signals having opposite polarities. In another embodiment, $V_{SIGNAL}$ 129 and modulation signal $V_{SIGNAL}'$ 131 are the same signals having the same polarities.

In one embodiment, the phase of the optical beam 111 that passes through the plurality of charged modulated regions 161 proximate to the interfaces defined between semiconductor material region 103 and semiconductor material regions 135 and 137 is modulated in response to the modulation signals $V_{SIGNAL}$ 129 and $V_{SIGNAL}'$ 131. In one embodiment, the phase of optical beam 111 passing through free charge carriers in the plurality of charged modulated regions 161 is modulated due to the free carrier dispersion effect. The free carrier dispersion effect arises due to an interaction between the optical electric field vector and free charge carriers that may be present along the propagation path of the optical beam 111. The presence of the free charge carriers alters the refractive index of the medium. The change of refractive index is accompanied by a change in the absorption of the medium via the Kramers-Kronig transformation. Generally the refractive index perturbation is a complex number with the real part being that part which causes the velocity change and the imaginary part being related to the free charge carrier absorption. The amount of phase shift φ is given by $$\phi = (2\pi/\lambda) \Delta n L \qquad \text{(Equation 1)}$$

with the optical wavelength in vacuum λ and the interaction length L. In the case of the free carrier dispersion effect in silicon, the refractive index change Δn due to the electron ($\Delta N_e$) and hole ($\Delta N_h$) concentration change is given by:

$$\Delta n = -\frac{e^2 \lambda^2}{8\pi^2 c^2 \varepsilon_0 n_0}\left(\frac{\Delta N_e}{m_e^*} + \frac{\Delta N_h}{m_h^*}\right) \qquad \text{(Equation 2)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively.

Figure 3:
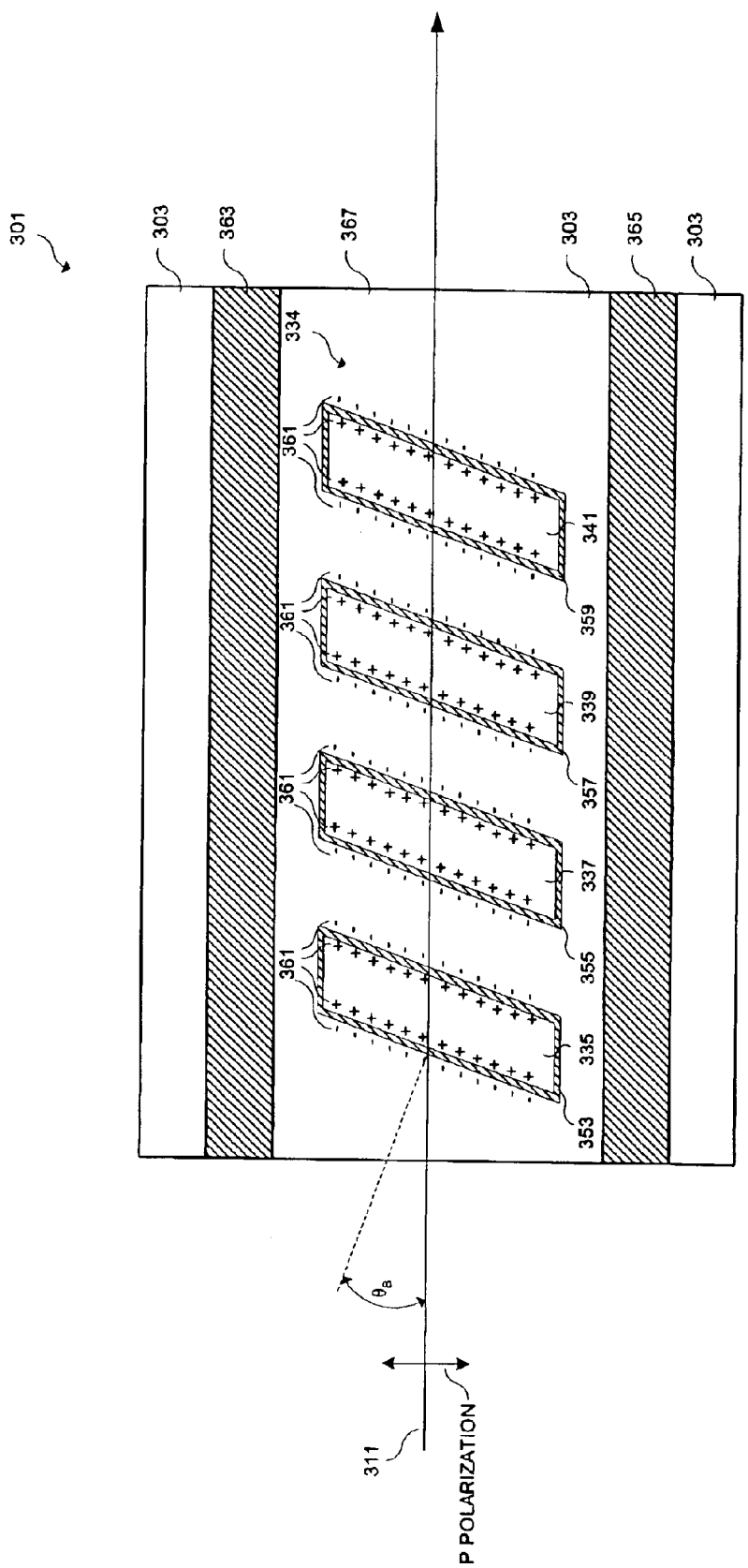
FIG. 3 is a top view illustration of one embodiment of an optical device including a phase modulating structure having Brewster angle incidence interfaces for an optical beam in accordance with the teachings of the present invention.

It is noted that phase adjusting device 134 of optical phase shifter 101 has been illustrated in FIG. 3 with two trench capacitors including semiconductor regions 135 and 137 in semiconductor material 103. It is appreciated that in other embodiments, phase adjusting device 134 may include a greater or fewer number of trench capacitors in accordance with the teachings of the present invention with the number of trench capacitors chosen to realize the desired phase shift.

It is noted that for explanation purposes, charge modulated regions 161 have been illustrated to include negative charge in semiconductor region 103 and positive charge in semiconductor regions 135 and 137. It is appreciated that in another embodiment, the polarities of these charges and the polarities of modulation signal $V_{SIGNAL}$ 129 and modulation signal V$_{SIGNAL}$' 131 may be reversed in accordance with the teachings of the present invention.

Figure 2:
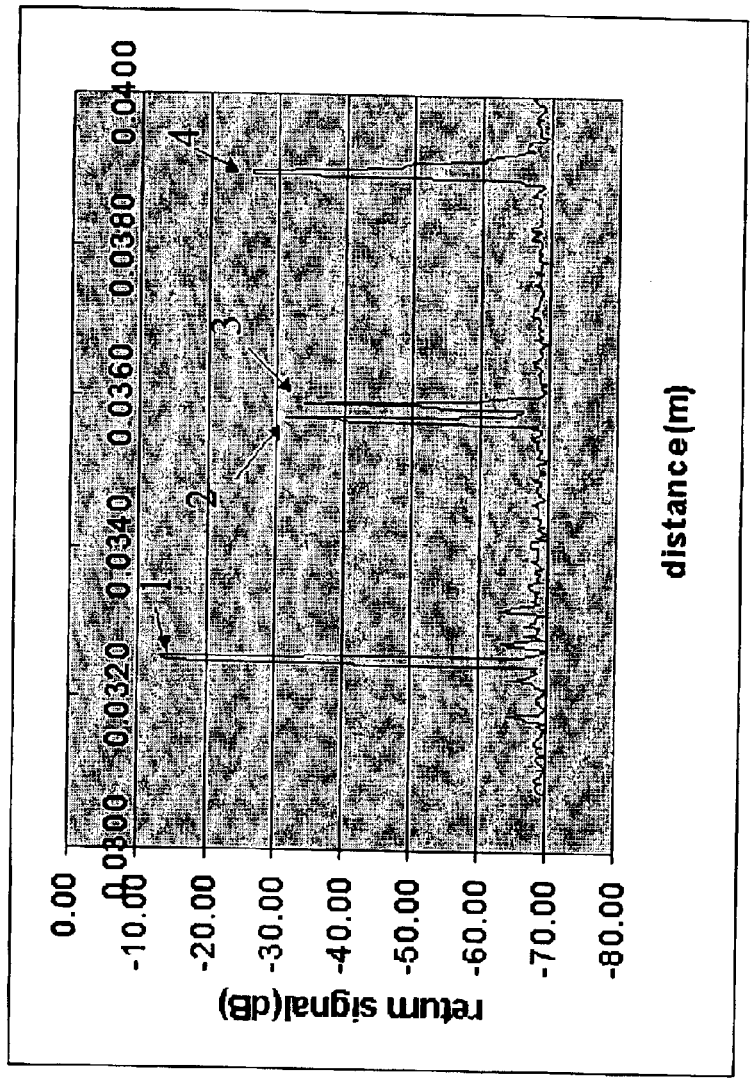
FIG. 2 is a diagram illustrating a reflectometry measurement for an optical device including a phase modulating structure having normal incidence interfaces for an optical beam.

In the embodiment illustrated in FIG. 1, it is noted that the light of optical beam 111 interacts at normal incidence with the Si/SiO2/Si interfaces defined at the interfaces between semiconductor material 103, insulating regions 153 and 155, and semiconductor regions 135 and 137. FIG. 2 is a diagram illustrating a reflectometry measurement for an optical device including a phase modulating structure having normal incidence interfaces for an optical beam. In the reflectometry measurement 201 illustrated in FIG. 2, an optical phase shifter similar to optical phase shifter 101, but including only a single trench capacitor, is measured. To illustrate, assume for example that only one semiconductor region 135 is included in the optical phase shifter measured in reflectometry measurement 201.

Referring to both FIG. 1 and FIG. 2, reflectometry measurement 201 illustrates that there is a reflection at peak 1 when optical beam 111 enters semiconductor material 103 and crosses the interface between air and semiconductor material 103. Peaks 2 and 3 illustrate that there are additional reflection peaks as optical beam 111 crosses through the interfaces defined between semiconductor material 103, insulating region 153 and semiconductor material 135. In the embodiment measured in reflectometry measurement 201, the thickness of insulating material 153 is only approximately 100 Angstroms, which is approximately $\frac{1}{40}^{th}$ of the wavelength of optical beam 111. Accordingly, peaks 2 and 3 appear only as "single" peaks along the x-axis of reflectometry measurement 201 since insulating material 153 is so thin. Finally, peak 4 illustrates the reflection that takes place as optical beam 111 crosses the interface while exiting semiconductor material 103 into air.

In one embodiment, the reflections that occur at the interfaces between the semiconductor material and insulating material in an optical phase shifter are substantially reduced or eliminated in accordance with the teachings of the present invention. To illustrate, FIG. 3 is a top view illustration showing generally one embodiment of an optical phase shifter 301 including a phase modulating structure 334 having Brewster angle incidence interfaces for an optical beam 311 in accordance with the teachings of the present invention.

As shown in FIG. 3, optical phase shifter 301 includes semiconductor material 303 through which an optical beam 311 is directed along an optical path. In one embodiment, optical beam 311 is directed through an optical waveguide defined in semiconductor material 303 between lateral optical confinement regions 363 and 365 disposed in semiconductor material 303. In one embodiment, lateral optical confinement regions 363 and 365 include oxide regions disposed in trenches formed in semiconductor material 303. In one embodiment, the optical waveguide defined in semiconductor material 303 may comprise an optical rib waveguide, an optical strip waveguide or any other suitable type of optical waveguide through which optical beam 311 may be directed.

As illustrated in the depicted embodiment, the optical path through which optical beam 311 is directed includes a phase adjusting device 334 disposed in semiconductor material 303. In one embodiment, the phase adjusting device 334 shares some similarities with phase shifting device 134 and includes a plurality of charge modulated regions 361 provided with a plurality of capacitive structures disposed in semiconductor material 303. As shown in the embodiment of FIG. 3, the charge modulated regions 361 are proximate to the interfaces defined between semiconductor material region 303 and semiconductor material regions 335, 337, 339 and 341 of phase adjusting device 334.

In the embodiment illustrated FIG. 3, the plurality of capacitive structures of phase adjusting device 334 are trench capacitors including semiconductor regions 335, 337, 339 and 341 disposed in semiconductor material 303. In the depicted embodiment, insulating regions 353, 355, 357 and 359 are disposed between semiconductor regions 335, 337, 339 and 341 and semiconductor material 303. In one embodiment, the semiconductor regions 335, 337, 339 and 341 of the trench capacitors include polysilicon, insulating regions 353, 355, 357 and 359 include an oxide such as SiO$_2$ and semiconductor material 303 includes silicon. In one embodiment, optical beam 311 includes infrared or near infrared laser light. As known to those skilled in the art, silicon is partially transparent to infrared or near infrared light. It is appreciated of course that other wavelengths may be utilized for optical beam 311 in accordance with the teachings of the present invention. In one embodiment, optical beam 311 is p polarized having light with polarization parallel to the plane of incidence of optical beam 311 on the trench capacitor.

In one embodiment, semiconductor regions 335, 337, 339 and 341 of the trench capacitors of phase adjusting device 334 receive a modulation signal to modulate the free charge carrier concentration in charge modulated regions 361. As optical beam 311 is directed through charge modulated regions 361, optical beam 311 is phase shifted in response to charge modulated regions 361 as a result of the free carrier dispersion effect.

As illustrated in the embodiment FIG. 3, the angle of incidence of optical beam on the plurality of interfaces between the insulating regions 353, 355, 357 and 359 and the neighboring semiconductor regions 335, 337, 339 and 341 and 303 is approximately equal to Brewster's angle $\theta_B$ in accordance with the teachings of the present invention. Brewster's angle $\theta_B$ can be determined using Brewster's law:

$$\tan\theta_B = \frac{n_2}{n_1} \quad \text{(Equation 3)}$$

where the incident optical beam is in medium 1 and the refracted optical beam is in medium 2, $n_1$ is the index of refraction of medium 1 and $n_2$ is the index of refraction of medium 2.

In accordance with Brewster's law, when optical beam 311 has an angle of incidence substantially equal to Brewster's angle $\theta_B$, the reflection coefficient for the p polarization component of optical beam 311 is zero. In one embodiment of the present invention, optical beam 311 is p polarized light, and therefore, the reflection coefficient of optical beam 311 is zero as it is directed through the plurality of interfaces between the insulating regions 353, 355, 357 and 359 and the neighboring semiconductor regions 335, 337, 339 and 341 and 303. Thus, referring briefly back to the reflectometry measurement 201 illustrated in FIG. 2, peaks 2 and 3 are reduced or substantially eliminated with optical phase shifter 301 in accordance with the teachings of the present invention.

Figure 4:
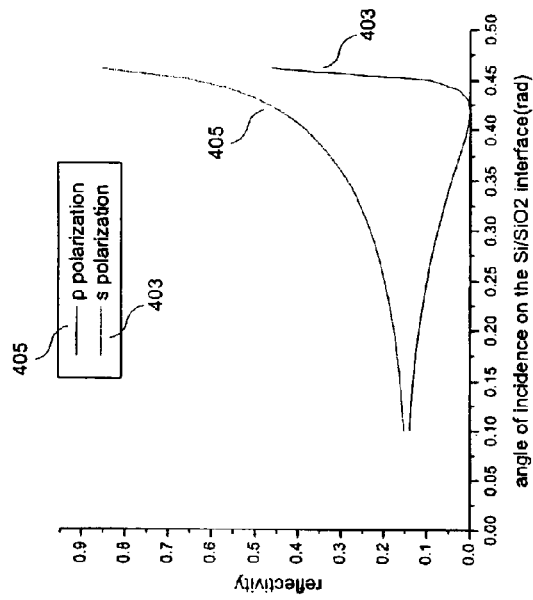
FIG. 4 is a diagram illustrating reflectivity curves for an optical device including a phase modulating structure having a Brewster angle incidence interface for an optical beam in accordance with the teachings of the present invention.

To illustrate, FIG. 4 is a diagram 401 illustrating reflectivity curves for an optical device including a phase modulating structure having a Brewster angle incidence interface for an optical beam in accordance with the teachings of the present invention. In the embodiment illustrated in FIG. 4, reflectivity curves for a single Si/SiO$_2$ interface are shown for s and p polarizations of an optical beam. In the depicted embodiment, the index of refraction SiO2 is 1.545 and the index of refraction for silicon is 3.47.

In FIG. 4, reflectivity curve 403 represents p polarized light having polarization parallel to the plane of incidence and reflectivity curve 405 represents s polarized light having polarization perpendicular to the plane of incidence. The plane of incidence is defined by the incident beam and the normal to the interface. FIG. 4 shows that the transmission of light in s and p polarizations is a function of the angle of incidence. As can be observed, the reflectivity coefficient of p polarization vanishes at the Brewster angle $\theta_B$ of 24 degrees or 0.42 radians. Therefore, the reflectivity of the optical beam drops to zero at the Brewster's angle $\theta_B$ for p polarized light. As the angle of incidence increases to more than 0.46 radians in FIG. 4, the reflectivity for both s and p polarizations approach 1.0 as the critical angle for total internal reflection is reached. It is appreciated of course that other indexes of refractions may be employed in other embodiments of the present invention and that the Brewster's angle $\theta_B$ for these other embodiments may be changed accordingly.

Referring back to the embodiment illustrated in FIG. 3, $\theta_B$ is equal to approximately 24 degrees or 0.42 radians for the angle of incidence for optical beam 311 in accordance with the teachings of the present invention. Since optical beam 311 is substantially all p polarized light in one embodiment, there is substantially no reflection of optical beam 311 at the Si/SiO$_2$ interfaces in accordance with the teachings of the present invention.

Figure 5:
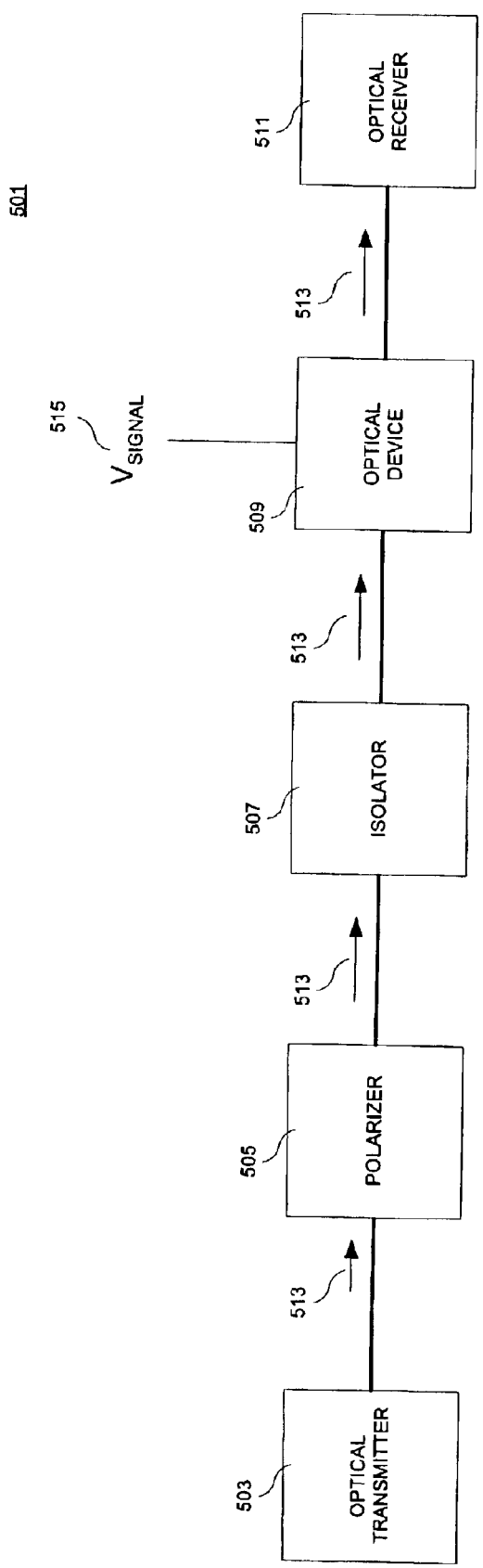
FIG. 5 is a block diagram illustration of one embodiment of a system including an optical transmitter and an optical receiver with an optical device according to embodiments of the present invention.

FIG. 5 illustrates generally a block diagram of one embodiment of a system including an optical transmitter and an optical receiver with an optical device according to embodiments of the present invention. In particular, FIG. 5 shows optical system 501 including an optical transmitter 503 and an optical receiver 511. In one embodiment, optical system 501 also includes an optical device 509 optically coupled between optical transmitter 503 and optical receiver 511. As shown in FIG. 5, optical transmitter 503 transmits an optical beam 513 that is received by optical device 509.

In one embodiment, optical device 509 may include for example a device such as optical phase shifter 301 from FIG. 3 to phase shift optical beam 511 in response to signal modulation signal $V_{SIGNAL}$ 515. In such an embodiment, optical device 509 may serve as an optical delay. In other embodiments, optical device may be employed to perform optical switching, optical modulation, or provide other optical solutions that incorporate an optical phase shifter in accordance with the teachings of the present invention.

In one embodiment, optical system 501 includes a polarizer 505 optically coupled between optical transmitter and optical device 509. In such an embodiment, polarizer 505 polarizes optical beam 515 received from optical transmitter 503 such that substantially all of optical beam 513 is p polarized as it is directed into optical device 509.

In one embodiment, optical system 501 includes an isolator 507, such as for example a Faraday isolator or the like, optically coupled between optical transmitter and optical device 509. In such an embodiment, isolator 507 is employed to isolate any light that is directed from optical device 509 back in the direction of optical transmitter 503. For example, in the event that some of optical beam 513 is reflected for whatever reason by optical device 509, isolator 507 is employed to prevent that reflected light from being directed back into optical transmitter 503.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical phase shifter, comprising:
   a first region of semiconductor material disposed in a second region of semiconductor material;
   an insulating region disposed between the first and second regions of semiconductor material;
   a plurality of interfaces defined between the insulating region and the first and second regions of semiconductor material, wherein an angle of incidence between an optical beam and the plurality of interfaces is substantially equal to Brewster's angle; and
   a plurality of charge modulated regions proximate to the plurality of interfaces in the first and second regions of semiconductor such that the optical beam directed through the plurality of interfaces and the plurality of charge modulated regions is phase shifted in response to the plurality of charge modulated regions.

2. The optical phase shifter of claim 1 wherein the plurality of charge modulated regions are adapted to be modulated in response to a signal coupled to be received by the first and second regions of semiconductor material.

3. The optical phase shifter of claim 1 wherein the first region of semiconductor material is one of a plurality of first regions of semiconductor material disposed in the second region of semiconductor material with a plurality of insulating regions disposed between each respective first region of semiconductor material and the second region of semiconductor material.

4. The optical phase shifter of claim 1 wherein the plurality of first regions of semiconductor material disposed in the second region of semiconductor material comprise a plurality of capacitive structures disposed in the second region of semiconductor material.

5. The optical phase shifter of claim 4 wherein the plurality of capacitive structures comprise a plurality of trench capacitors disposed in the second region of semiconductor material.

6. The optical phase shifter of claim 1 wherein the first region of semiconductor material comprises polysilicon, the second region of semiconductor material comprises silicon and the insulating region comprises an oxide material.

7. The optical phase shifter of claim 6 wherein the Brewster's angle is approximately equal to 24 degrees.

8. The optical phase shifter of claim 1 wherein the optical beam is a p polarized optical beam.

9. The optical phase shifter of claim 1 further comprising an optical waveguide disposed in the semiconductor material, the plurality of charge modulated regions proximate to the plurality of interfaces disposed along an optical path of the waveguide through which the optical beam is directed.

10. The optical phase shifter of claim 9 wherein the optical waveguide comprises a rib waveguide disposed in the semiconductor material.

11. A method, comprising:
   modulating a charge concentration in a charged modulated region at an interface between semiconductor material and insulating material in a semiconductor device;
   directing an optical beam through the charge modulated region and the interface at a Brewster's angle with respect to a propagation direction of the optical beam; and phase shifting the optical beam in response to the modulated charge concentration in the charge modulated region.

12. The method of claim 11 further comprising polarizing the optical beam prior to directing the charge modulated region and the interface.

13. The method of claim 12 wherein polarizing he optical beam comprises p polarizing the optical beam to a plane of incidence at the interface prior to directing the charge modulated region and the interface.

14. The method of claim 11 further comprising isolating a reflection of the optical beam from the interface.

15. The method of claim 11 wherein modulating the charge concentration in the charged modulated region comprises applying a signal to a plurality of capacitive structures disposed in the semiconductor material.

16. The method of claim 11 wherein phase shifting the optical beam comprises modulating a refractive index of the semiconductor material in the charged modulated region.

17. A system, comprising:
an optical transmitter to generate an optical beam;
an optical receiver optically coupled to receive the optical beam;
an optical device optically coupled between the optical transmitter and the optical receiver, the optical device including an optical phase shifter to modulate a phase of the optical beam, the optical phase shifter including:
a first region of semiconductor material disposed in a second region of semiconductor material;
an insulating region disposed between the first and second regions of semiconductor material;
a plurality of interfaces defined between the insulating region and the first and second regions of semiconductor material, wherein an angle of incidence between the optical beam and the plurality of interfaces is substantially equal to Brewster's angle; and
a plurality of charge modulated regions proximate to the plurality of interfaces in the first and second regions of semiconductor such that the optical beam directed through the plurality of interfaces and the plurality of charge modulated regions is phase shifted in response to the plurality of charge modulated regions.

18. The system of claim 17 wherein the plurality of charge modulated regions are adapted to be modulated in response to a signal coupled to be received by the first and second regions of semiconductor material.

19. The system of claim 17 wherein the first region of semiconductor material is one of a plurality of first regions of semiconductor material disposed in the second region of semiconductor material with a plurality of insulating regions disposed between each respective first region of semiconductor material and the second region of semiconductor material.

20. The system of claim 17 wherein the plurality of first regions of semiconductor material disposed in the second region of semiconductor material comprise a plurality of capacitive structures disposed in the second region of semiconductor material.

21. The system of claim 20 wherein the plurality of capacitive structures comprise a plurality of trench capacitors disposed in the second region of semiconductor material.

22. The system of claim 17 wherein the first region of semiconductor material comprises polysilicon, the second region of semiconductor material comprises silicon and the insulating region comprises an oxide material.

23. The system of claim 22 wherein the Brewster's angle is approximately equal to 24 degrees.

24. The system of claim 17 wherein the optical beam is a p polarized optical beam.

25. The system of claim 17 further comprising an optical waveguide disposed in the semiconductor material, the plurality of charge modulated regions proximate to the plurality of interfaces disposed along an optical path of the waveguide through which the optical beam is directed.

26. The system of claim 25 wherein the optical waveguide comprises a rib waveguide disposed in the semiconductor material.

27. The system of claim 17 further comprising a polarizer disposed between the optical transmitter and the optical phase shifter.

28. The system of claim 17 further comprising an isolator disposed between the optical transmitter and the optical phase shifter.

* * * * *